(12) United States Patent
Fosnight et al.

(10) Patent No.: US 12,515,879 B2
(45) Date of Patent: Jan. 6, 2026

(54) ORDER FULFILLMENT SYSTEM WITH AUTOMATED DISPENSING HAVING INTEGRATED TURNING DECKS

(71) Applicant: Symbotic LLC, Wilmington, MA (US)

(72) Inventors: William J. Fosnight, Windham, NH (US); Michael Chesna, Saugus, MA (US); Christopher J. Dancewicz, Salem, NJ (US); Alan Grant, Nashua, NH (US); Derek J. McGearty, Lowell, MA (US)

(73) Assignee: Symbotic LLC, Wilmington, MA (US)

( * ) Notice: Subject to any disclaimer, the term of this patent is extended or adjusted under 35 U.S.C. 154(b) by 534 days.

(21) Appl. No.: 17/957,266

(22) Filed: Sep. 30, 2022

(65) Prior Publication Data

US 2023/0099222 A1    Mar. 30, 2023

Related U.S. Application Data

(60) Provisional application No. 63/250,809, filed on Sep. 30, 2021.

(51) Int. Cl.
*B65G 1/04* (2006.01)
*B65G 1/137* (2006.01)

(52) U.S. Cl.
CPC ......... *B65G 1/0492* (2013.01); *B65G 1/1373* (2013.01); *B65G 2201/0258* (2013.01)

(58) Field of Classification Search
CPC .. B65G 1/0485; B65G 1/0492; B65G 1/1373; B65G 2201/02; B25J 5/02
See application file for complete search history.

(56) References Cited

U.S. PATENT DOCUMENTS

| | | | | |
|---|---|---|---|---|
| 4,883,401 | A | * | 11/1989 | Kavieff ................ B65G 1/0485 414/281 |
| 2019/0239640 | A1 | * | 8/2019 | Lert, Jr. .................. B65G 1/026 |
| 2019/0245366 | A1 | * | 8/2019 | Coady .................. B65G 1/1373 |
| 2019/0307077 | A1 | * | 10/2019 | Lert, Jr. ............... A01G 31/042 |
| 2021/0354919 | A1 | * | 11/2021 | Liu ................... G05B 19/41845 |
| 2023/0033636 | A1 | * | 2/2023 | Krishna Mohan ....... B65G 1/06 |
| 2023/0095494 | A1 | * | 3/2023 | Simpson .............. B65G 1/0485 700/216 |
| 2024/0190658 | A1 | * | 6/2024 | Lindbo ................ B65G 1/1375 |

* cited by examiner

*Primary Examiner* — Kaitlin S Joerger
(74) *Attorney, Agent, or Firm* — Perman & Green, LLP

(57) ABSTRACT

An order fulfillment system includes a storage structure and integrated turning decks enabling mobile robots to pass between sections of the storage structure or to exit or enter the storage structure. An automated dispensing portion may be affixed to a turning deck, which automated dispensing portion connects with a dispensing portal. Thus, the turning deck allows direct transport of mobile robots between the storage structure and the dispensing portal.

19 Claims, 8 Drawing Sheets

ORDER FULFILLMENT SYSTEM WITH AUTOMATED DISPENSING HAVING INTEGRATED TURNING DECKS

PRIORITY DATA

The present application claims priority to U.S. Provisional Patent Application No. 63/250,809, filed on Sep. 30, 2021, entitled "ORDER FULFILLMENT SYSTEM WITH AUTOMATED DISPENSING HAVING INTEGRATED TURNING DECKS", which application is incorporated by reference herein in its entirety.

BACKGROUND

An order-fulfillment system for use in supply chains, for example in retail supply chains, may fulfill orders for individual product units or goods. Conventional systems may store totes including the goods in a storage structure including storage location arrays. The storage locations in the structure may be accessible by mobile robots which may for example travel within an aisle between a pair of storage location arrays. In the operation of such systems, it may be desirable to allow a mobile robot to change direction or exit the storage structure while traveling within the storage structure.

BRIEF DESCRIPTION OF THE DRAWINGS

Embodiments of the present technology will now be described with reference to the figures which include the following.

DETAILED DESCRIPTION

Embodiments of the present technology will now be described with reference to the figures, which in general relate to an order fulfillment system with automated dispensing and customer portals having integrated turning decks. The embodiments described enable efficient routing of mobile robots, for example, by enabling the mobile robots to turn and change direction in a small area on a turning deck. Further and as will be described, the embodiments are intended to enable efficient movements of mobile robots from storage locations to the customer access portals.

It is understood that the present embodiments may be embodied in many different forms and should not be construed as being limited to the embodiments set forth herein. Rather, these embodiments are provided so that this disclosure will be thorough and complete and will fully convey the invention to those skilled in the art. Indeed, the embodiments are intended to cover alternatives, modifications and equivalents of these embodiments, which are included within the scope and spirit of the invention as defined by the appended claims. Furthermore, in the following detailed description, specific details are set forth in order to provide an understanding of the present embodiments.

The terms "top" and "bottom," "upper" and "lower" and "vertical" and "horizontal" as may be used herein are by way of example and illustrative purposes only and are not meant to limit the description of the embodiments inasmuch as the referenced item can be exchanged in position and orientation. Also, as used herein, the terms "substantially" and/or "about" mean that the specified dimension or parameter may be varied within an acceptable manufacturing tolerance for a given application. In one non-limiting embodiment, the acceptable manufacturing tolerance is ±0.25%.

For purposes of this disclosure, a connection may be a direct connection or an indirect connection (e.g., via one or more other parts). In some cases, when a first element is referred to as being connected, affixed or coupled to a second element, the first and second elements may be directly connected, affixed or coupled to each other or indirectly connected, affixed or coupled to each other. When a first element is referred to as being directly connected, affixed or coupled to a second element, then there are no intervening elements between the first and second elements (other than possibly an adhesive or weld used to connect, affix or couple the first and second elements).

Figure 1A:
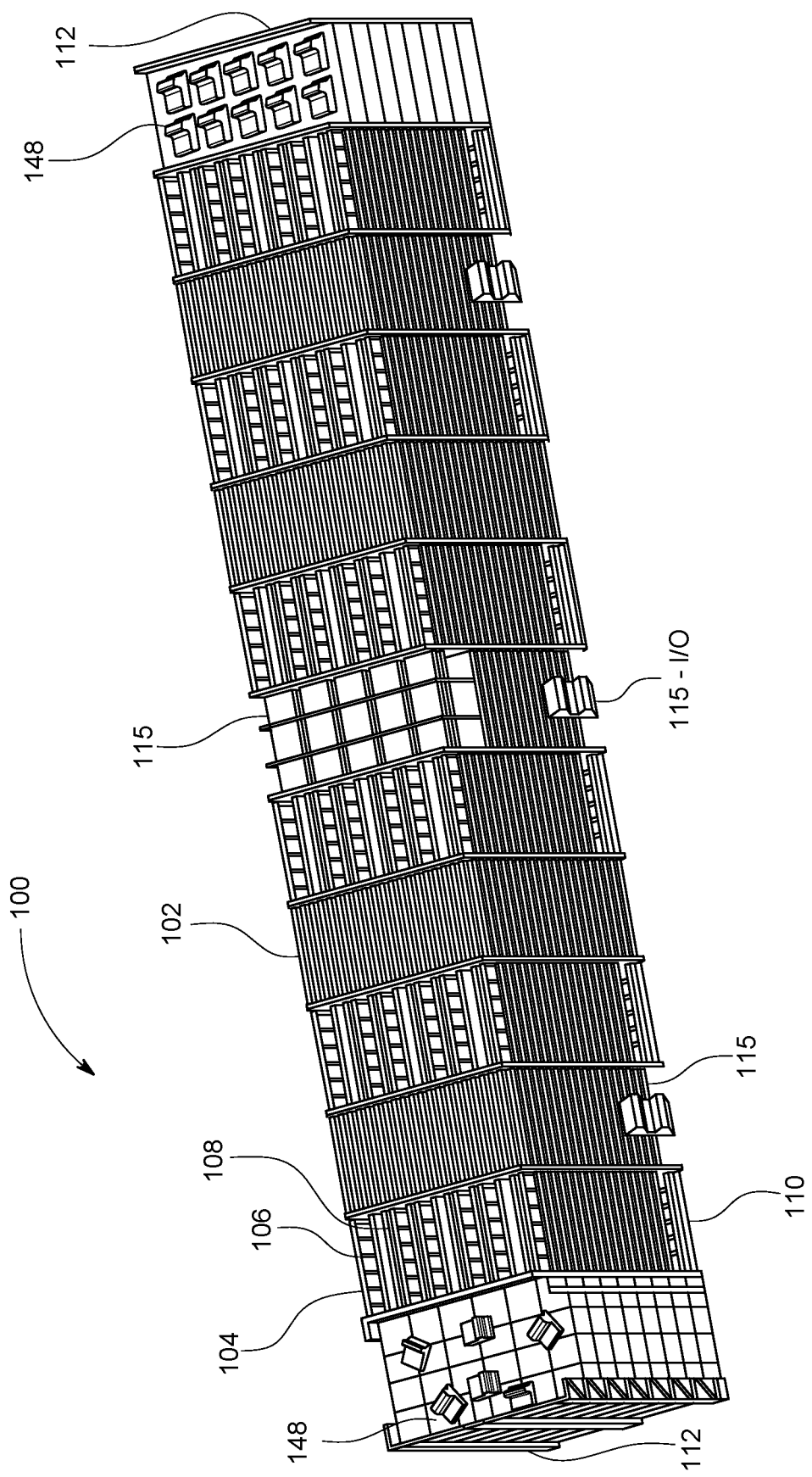
FIGS. 1A-1C show partial views of an order fulfillment facility including a storage structure, turning decks and an automated dispense portion according to embodiments of the present technology.
Figure 1B:
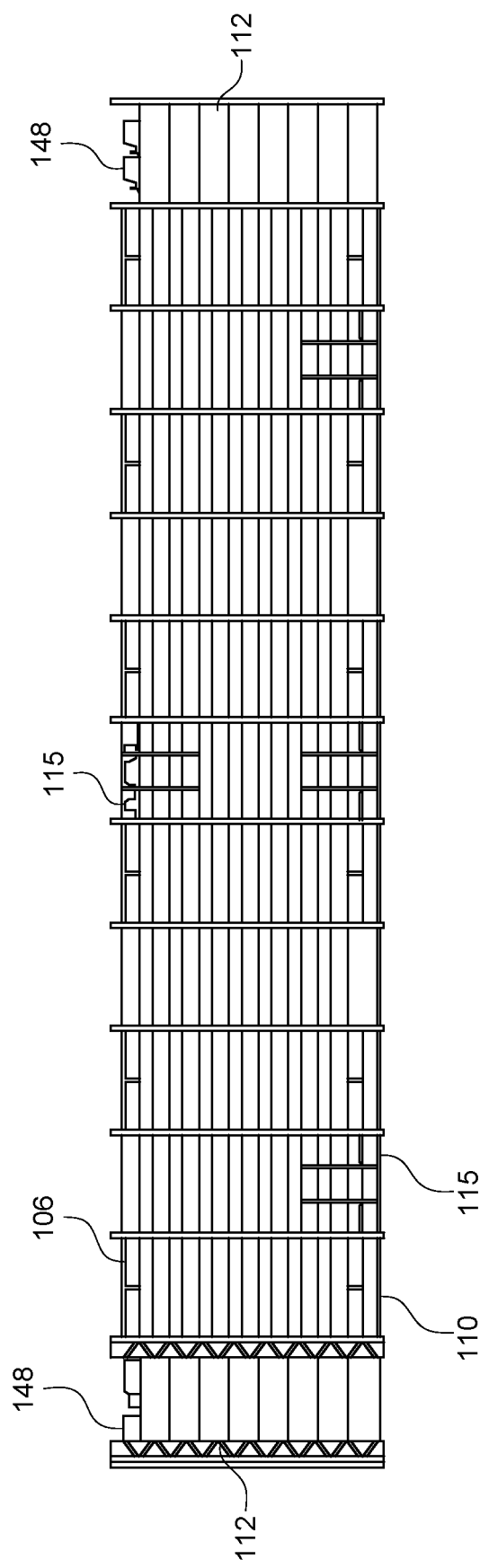
Figure 1C:
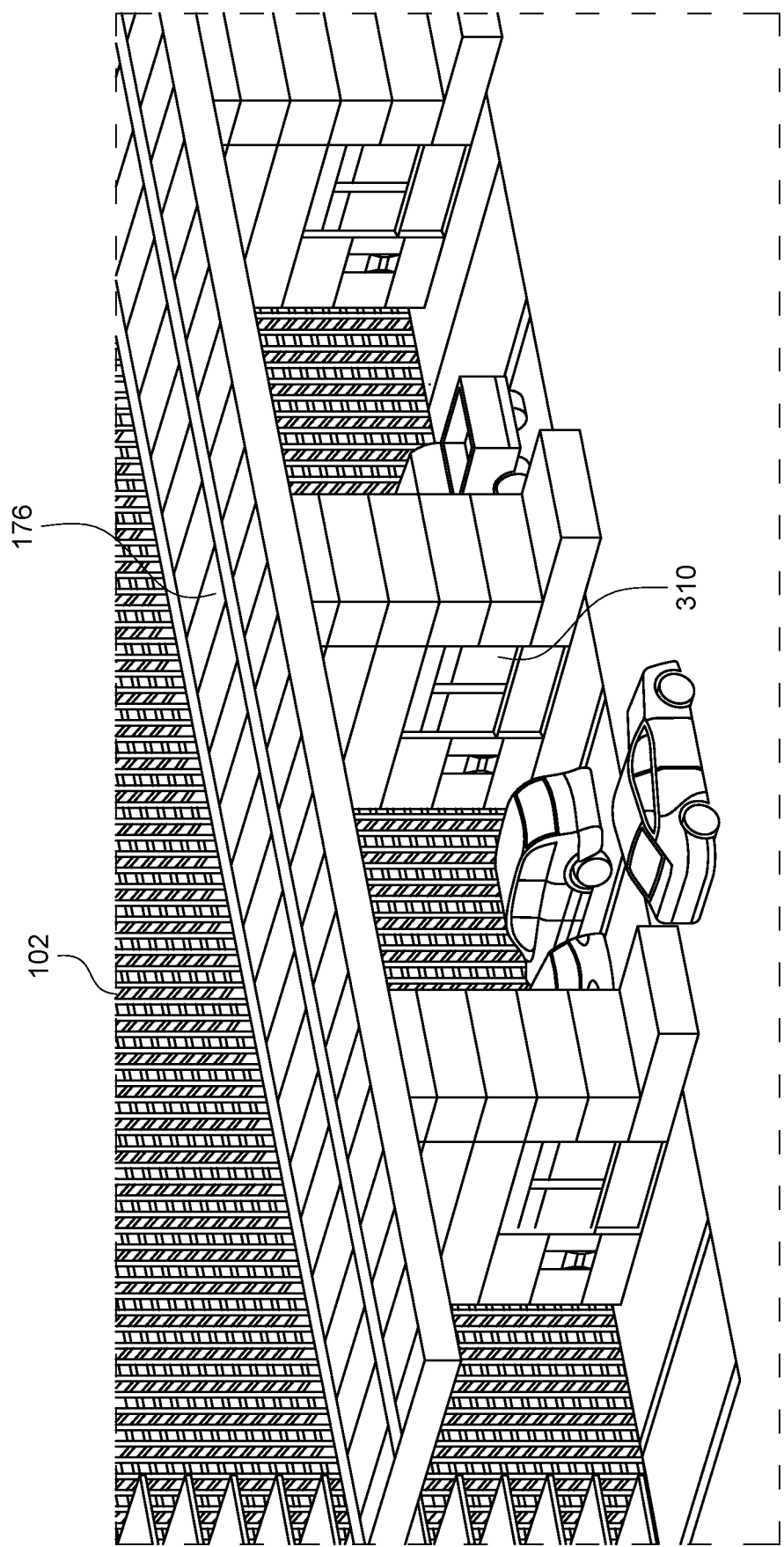

FIGS. 1A-1C show a partial view of an embodiment of an order fulfillment facility 100 showing a storage structure 102 including a number of bays 104 of storage locations 106 in communication with an automated dispense portion 176. In accordance with aspects of the present technology, the storage structure 102 may be formed of a number of storage modules 110 as explained below. The bays 104 defined by the storage modules 110 each include a y-z array of storage locations 106 in horizontal rows and level changing towers along the rows which in embodiments may be vertical towers. Mobile robots 148 may travel between storage levels in the z-direction within the level changing towers. The storage modules 110 form pairs of bays 104 that are arranged to face each other, separated by aisles 108. An aisle 108 may have a width such that a mobile robot 148 traveling within an aisle 108 may transfer containers to the bays 104 on either side of the aisle 108. In accordance with other aspects of the present technology the automated dispense portion 176 may be in communication with the storage structure 102 and include an automated dispense portal 310. The automated dispense system may be configured to allow mobile robots 148 to travel to and from the storage structure 102 and the automated dispense portal 310. The mobile robots 148 may carry totes containing goods to be delivered to the user through the automated dispense portal 310. In alternative embodiments, the mobile robots 148 may carry totes containing goods to be returned to the storage structure 102. The automated dispense portal 310 may be configured to allow users to pull up their vehicles adjacent to the automated dispense portals 310 and access to the portals 310 for pick up or return of goods.

The order fulfillment facility 100 may further include decks 112 spaced apart at different horizontal levels of the storage structure 102. The decks 112 may extend between the aisles so that mobile robots 148 can maneuver in the x-y plane of each deck to travel between different aisles. At least one of the decks 112 may also extend into the respective aisles to allow technicians to walk into an aisle 108 to service components within the aisle.

FIGS. 1A-1C also show examples of integrated turning decks 115, which will be discussed in more detail below. The turning decks 115 may be positioned at different vertical locations between the storage modules 110. The turning decks 115 may have a turning deck input/output 115-I/O that may align with the aisle 108 or another turning deck input/output 115-I/O. The turning deck 115 may enable the mobile robot 148 to efficiently change a direction of travel through the storage structure 102.

As noted above, the order fulfillment facility 100 may further include a number of mobile robots 148 for transferring totes or other product or order containers to and from customer access portals and storage locations 106 in the bays 104. The mobile robots 148 may be self-guided and/or rail-guided so as to move horizontally and vertically within aisles 108 to transfer totes or other product containers between the mobile robots 148 and storage locations 106. For example, a track system including horizontal rails may be affixed to the bays 104 at different vertical levels. The horizontal rails provide access to storage shelves on either side of an aisle 108 in the x-direction on a given level. The bays 104 include vertical level changing towers within which the mobile robots may travel vertically in the z-direction between levels of storage locations 106.

Further details of the work stations, storage structure, mobile robots, automated dispense system and customer access portals which may be used are described for example in the following U.S. patents and patent applications: U.S. Pat. No. 9,139,363, entitled "AUTOMATED SYSTEM FOR TRANSPORTING PAYLOADS," issued Sep. 22, 2015; U.S. Pat. No. 10,435,241, entitled, "STORAGE AND RETRIEVAL SYSTEM," issued Oct. 8, 2019; U.S. Pat. No. 11,142,398, entitled, "ORDER FULFILLMENT SYSTEM," issued Oct. 12, 2021; U.S. Pat. No. 10,984,375, entitled "PICKING WORKSTATION WITH MOBILE ROBOTS & MACHINE VISION VERIFICATION OF EACH TRANSFERS PERFORMED BY HUMAN OPERATORS," issued Apr. 20, 2021; U.S. Pat. No. 10,952,533, entitled "MODULAR STRUCTURE FOR AN AUTOMATED STORAGE AND RETRIEVAL SYSTEM," issued Mar. 23, 2021; U.S. Pat. No. 11,267,651, entitled, "SYSTEM HAVING WORKSTATION WITH TOTE RETENTION AND RELEASE MECHANISM," issued Mar. 8, 2022; and U.S. Patent Application No. 63/127,762, entitled, "MICRO-FULFILLMENT CENTER WITH AUTOMATED DISPENSE AND RETURN USING MOBILE ROBOTS AND METHOD OF OPERATING SAME," filed on Dec. 18, 2020. Each of these patents and applications are incorporated by reference herein in their entirety.

Figure 2A:
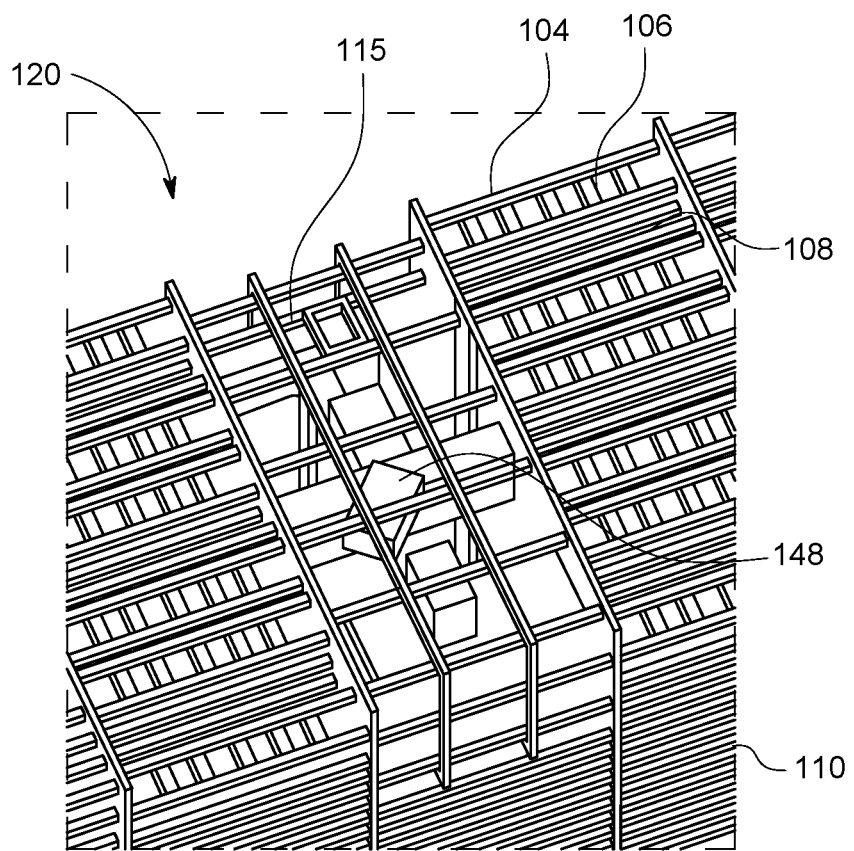
FIGS. 2A-2D show various views of an array of turning decks according to embodiments of the present technology.
Figure 2B:
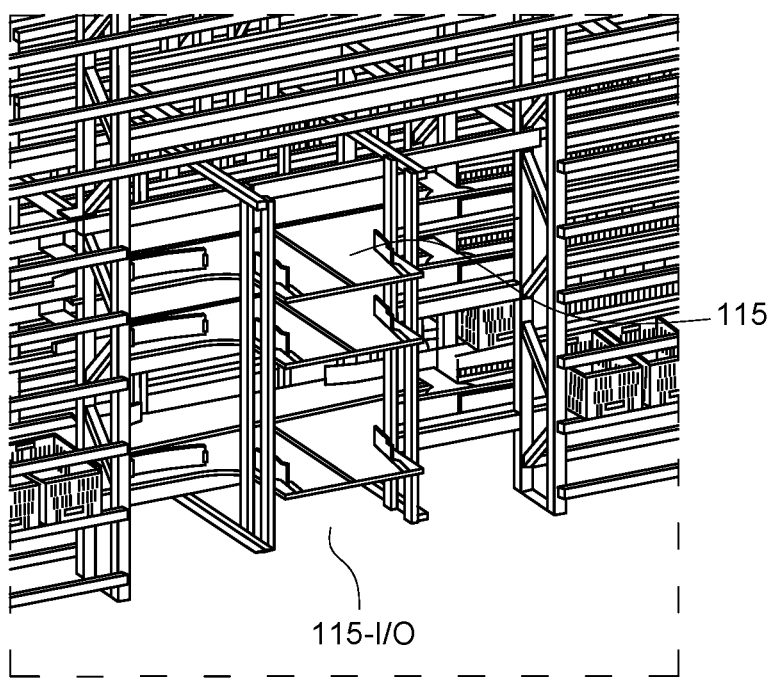
Figure 2C:
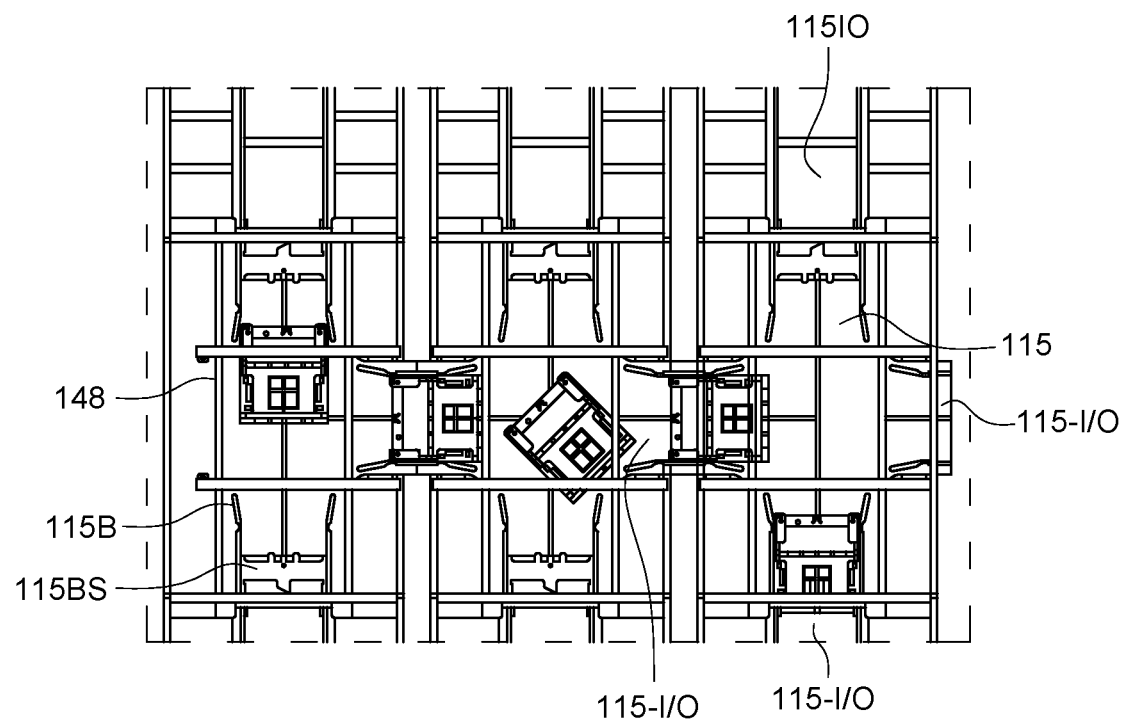
Figure 2D:
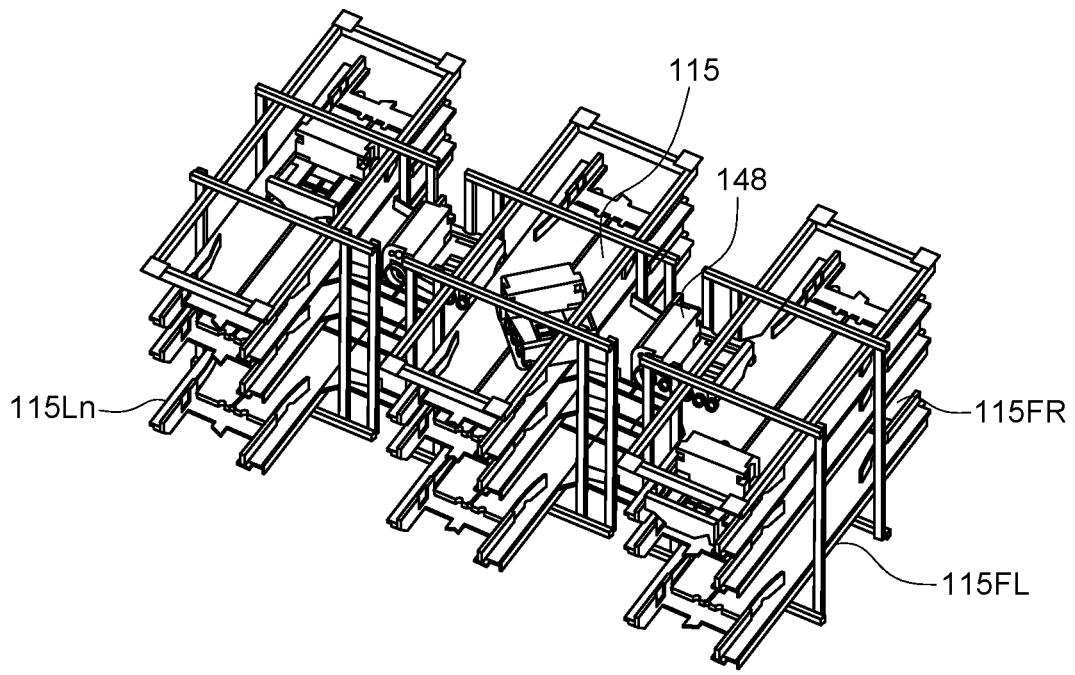

FIGS. 2A-2B are schematic illustrations, isometric views and perspective views of an order fulfillment facility 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used. It is also noted that while X, Y and Z axis are referred to, reference of these axes may have any suitable directional identifiers.

Referring to FIGS. 2A-2D, the order fulfillment facility 100 may include a storage structure 102, storage modules 110 and turning decks 115. The storage structure 102 may include a number of bays 104 of storage locations 106. The bays 104 each may include an y-z array of storage locations 106 and horizontal rows and level changing towers along the rows which in embodiments may be vertical towers. The turning decks 115 may be positioned at different vertical levels and extend between the aisles 108 of the storage modules 110. The mobile robots 148 may transit over the aisles 108 and onto the turning decks 115. Upon entering the turning decks 115 the mobile robot 148 may efficiently change directions in the x-y plane and proceed onto a second turning deck 115.

Alternatively, upon entering the turning deck 115, the mobile robot 148 may transit across the turning deck 115 and continue down the aisle 108. The mobile robot 148 may efficiently change direction by entering onto the turning deck 115 and initiating a multi-point turn that may include moving forward on the center line, moving forward at a defined angle, reversing backward onto the centerline and then moving forward exiting the turning deck 115. In alternative embodiments, the mobile robot 148 may efficiently change direction by entering onto the turning deck 115 and initiating a zero turn by pivoting around the rear wheels of the mobile robot 148. Alternatively, the mobile robot 148 may change direction on the turning deck 115 by initiating any acceptable turning scheme.

Referring again to FIGS. 2A-2D, the order fulfillment facility 100 may include a storage structure 102, storage modules 110 and turning decks 115. The turning deck 115 may have turning deck input/output 115-I/O. In one embodiment the turning deck 115 may have three input/output 115-I/O and in alternative embodiments the turning deck 115 may have four input/output 115-I/O. Alternatively, the turning deck 115 may have any suitable number of input/outputs 115-I/O. The turning deck input/output 115-I/O may be configured to communicate with the aisle 108 or alternatively with the turning deck input/output 115-I/O of an adjacent turning deck 115. The turning deck input/output 115-I/O may have a bumper system 115BS that may be configured to guide the mobile robot 148 onto the aisle 108 or the adjacent turning deck 115. The bumper system 115BS may have bumpers 115B on either side of the turning deck input/output 115-I/O and is configured to position the mobile robot on the centerline of the turning deck input/output 115-I/O. In alternative embodiments the bumper system 115BS may have any suitable number of bumpers 115B.

In embodiments, the bumper system 115BS or other guiding mechanism may be passive. That is, the bumper system 115BS allows the mobile robot to go in any direction upon entering a turning deck: straight through to the next aisle, left to an adjacent turning deck or transit rail (explained below) or right to an adjacent turning deck or transit rail. In further embodiments, the bumper system 115BS or other guiding mechanism may be directed, i.e., configured to guide the mobile robot in a particular (single) direction upon entering a turning deck: straight through to the next aisle, left to an adjacent turning deck or transit rail or right to an adjacent turning deck or transit rail. A turning deck 115 may also be made configurable by including or not including turning deck I/O 115-I/O. Where a turning deck does not include a turning deck I/O 115-I/O, a mobile robot may pass straight through the turning deck to the next aisle. Where a turning deck includes a turning deck I/O 115-I/O to the left or right, a mobile robot may pass straight through the turning deck to the next aisle, or go left or right. Where a turning deck includes a pair of turning decks I/O 115-I/O to the left and right, a mobile robot may pass straight through the turning deck to the next aisle, go left and/or go right.

Referring again to FIGS. 2A-2D, the order fulfillment facility 100 may include a storage structure 102, storage modules 110 and turning decks 115. The turning deck 115 may be constructed of a frame 115FR and a floor on 115FL. As discussed above, the turning decks may be positioned between the storage modules 110 and at various turning deck levels 115Ln. In one embodiment, there may be multiple turning deck levels 115Ln located near the top of the storage structure 102 and in alternative embodiments there may be multiple turning deck levels 115Ln located near the bottom of the storage structure 102. Alternatively, any number of turning deck levels 115Ln may be located at any suitable location within the storage structure 102. The turning deck frame 115FR may be configured to support the turning deck floor 115FL at any suitable connection points, using any suitable connector, between the turning deck frame 115FR and the turning deck floor 115FL.

Figure 3A:
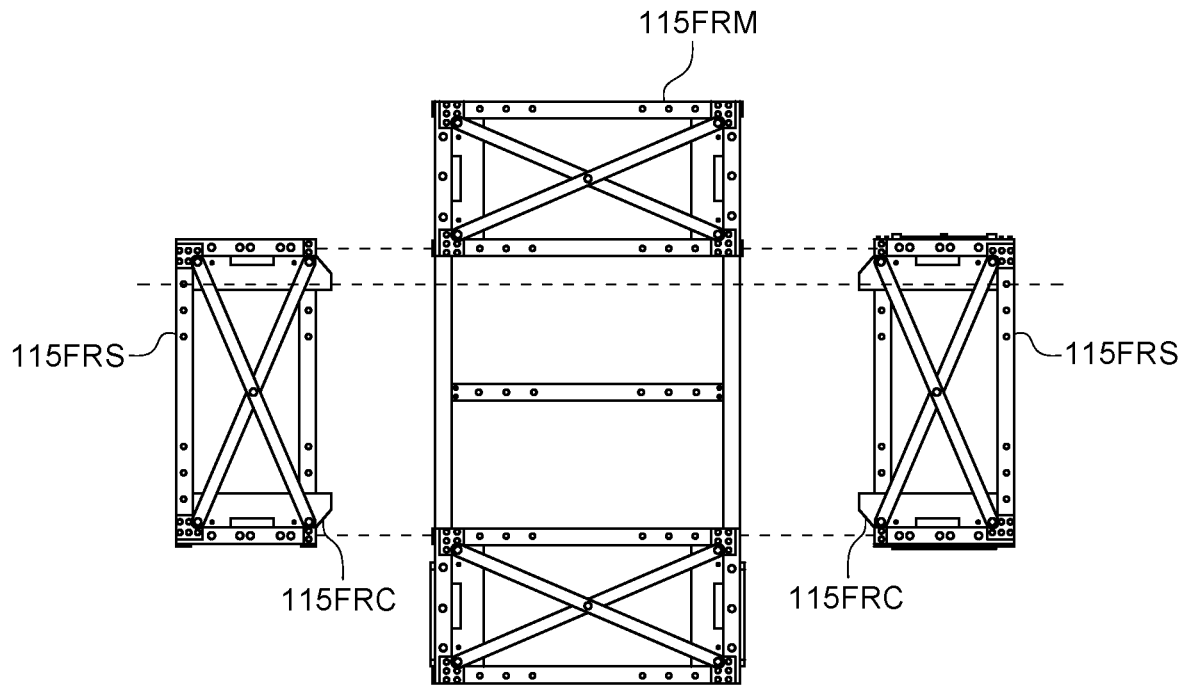
FIGS. 3A-3B show views of a frame for supporting the turning decks according to embodiments of the present technology.
Figure 3B:
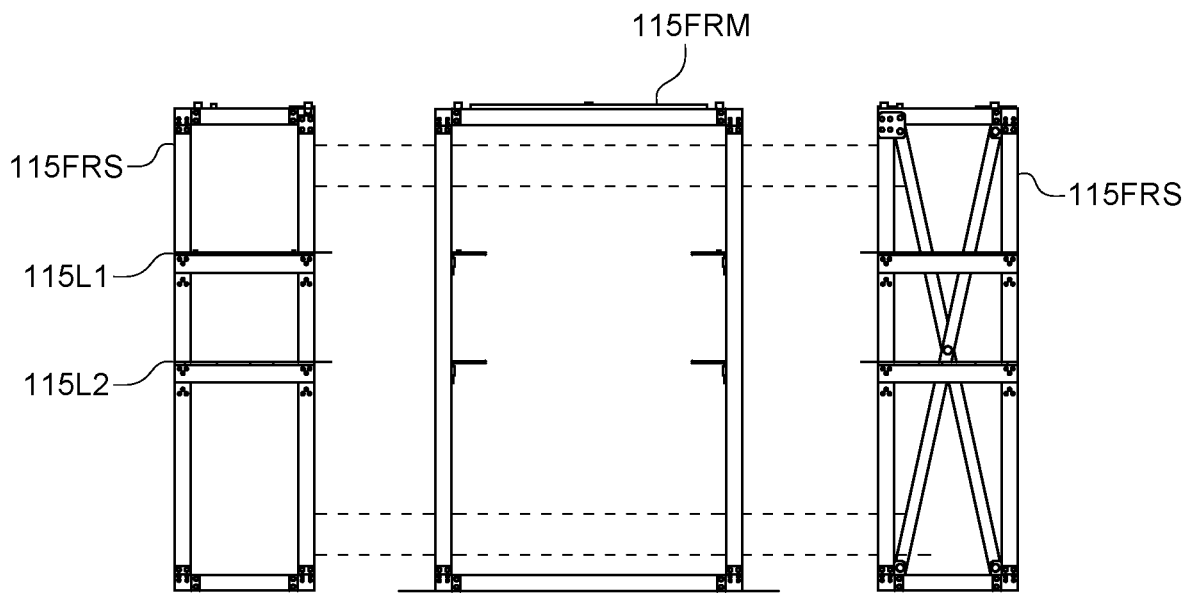

Referring now to FIGS. 3A-3B, the order fulfillment facility 100 may include turning decks 115. As discussed above, in one embodiment the turning deck 115 may include three turning deck input/output 115-I/O and in another embodiment the turning deck 115 may include four turning deck input/output 115-I/O. The turning deck frame 115FR may be configured to be modular and include a turning deck frame main module 115FRM and at least one turning deck frame side module 115FRS. The turning deck frame side module 115FRS may include connection features 115FRC configured to removably connect to the turning deck frame main module 115FRM. In one embodiment, the turning deck frame side module 115FRS may include the bumper system 115BS. In alternative embodiments, the turning deck frame side module 115FRS may not include the bumper system 115BS. Alternatively, the turning deck frame side module 115FS may include any guidance system configured to position the mobile robot 148 on the center line of the turning deck input/output 115-I/O. In alternative embodiments, the turning deck frame 115FR may be configured from a solid construction that includes three or four turning deck input/output 115-I/O. Alternatively, the solid constructed turning deck frame 115FR may include any suitable number of turning deck input/output 115-I/O. As discussed above, a turning deck 115 may be located at any number of turning deck levels 115Ln and at any suitable location within the storage structure 102. Referring now to FIG. 3B, in one embodiment a turning deck frame 115FR may be configured to have two turning deck levels 115L1 and 115L2. Alternatively, a turning deck frame 115FR may have any suitable number of turning deck levels 115Ln.

The turning decks 115 may be used by the automated dispense portion 176 to transfer totes via the mobile robots 148 between the storage structure 102 and the dispense portals 310. The automated dispense portion 176 is shown partially in FIG. 1C, and in more detail in FIGS. 4A and 4B. One section of the automated dispense portion 176 is shown uncovered in FIG. 4B. The automated dispense portion 176 may include bot transit rails 214 including horizontal rails on multiple levels for horizontal transport of mobile robots 148, and vertical towers 216 for vertical transport of the mobile robots. The number of transit rails 214 and vertical towers 216 is by way of example and there may be more or less of rails 214 and/or towers 216 in further embodiments.

Mobile robots may travel from the storage structure 102 to the horizontal transit rails 214 via the turning decks 115. In particular, bots may enter a turning deck from an aisle and turn left or right onto a turning deck I/O 115-I/O, and from there, onto transit rails 214. As noted above, there may be multiple levels of turning decks 115, and some or all of them may be connected to a transit rail 214. In this way, mobile robots 148 may carry totes directly from the storage structure 102 to a dispense portal 310 via a turning deck 115 and dispense portion 176. Similarly, mobile robots 148 may carry totes directly from a dispense portal 310 to the storage structure 102 via a turning deck 115 and dispense portion 176. Further details of an exemplary dispense portion 176 are disclosed in U.S. Patent Application No. 63/127,762 filed Dec. 18, 2020 and entitled "Micro-Fulfillment Center With Automated Dispense And Return Using Mobile Robots And Method Of Operating Same," which is incorporated by reference herein in its entirety.

Figure 4A:
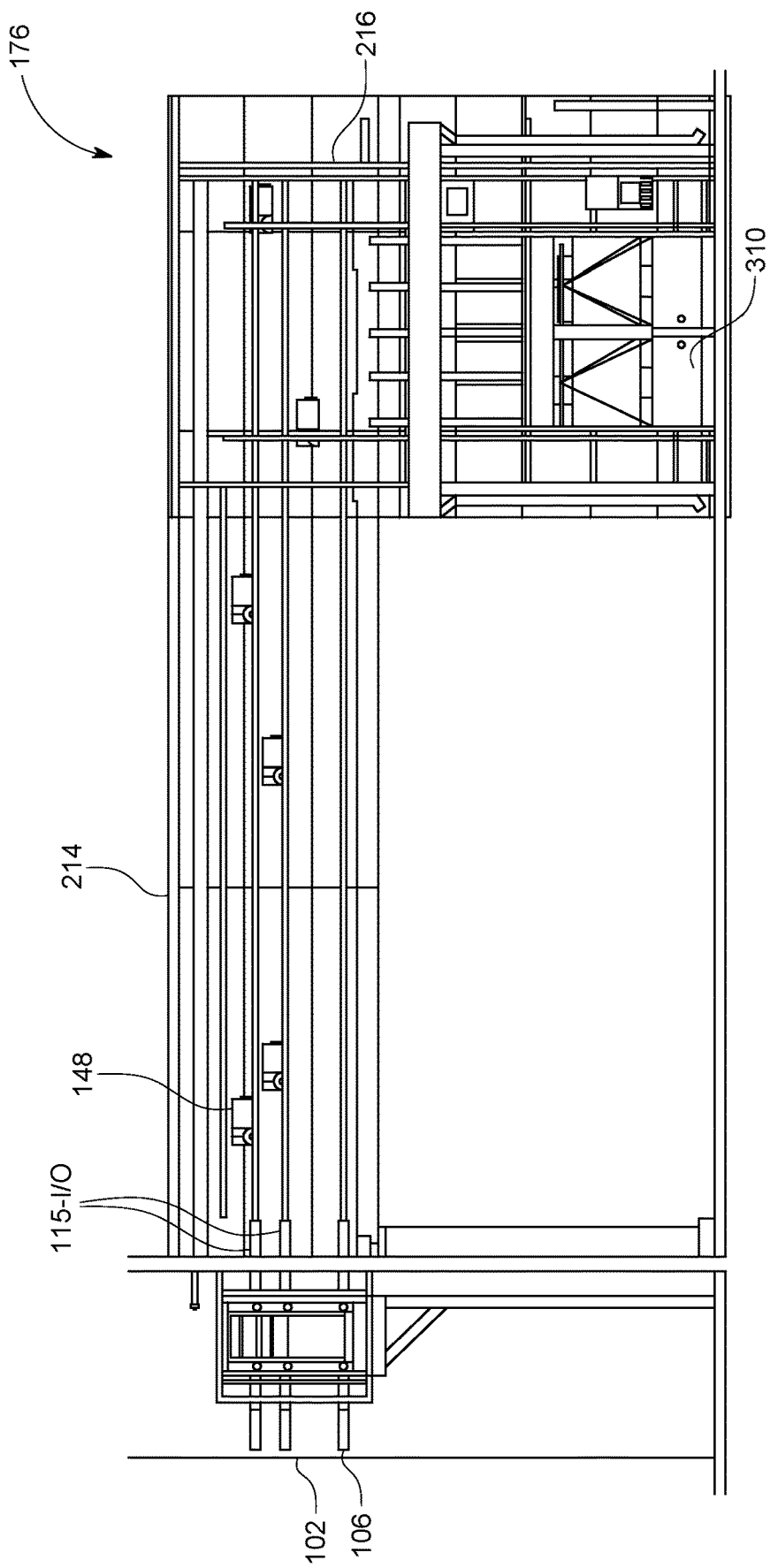
FIGS. 4A-4B shows views of a storage structure connected to an automated dispense portion via turning decks.
Figure 4B:
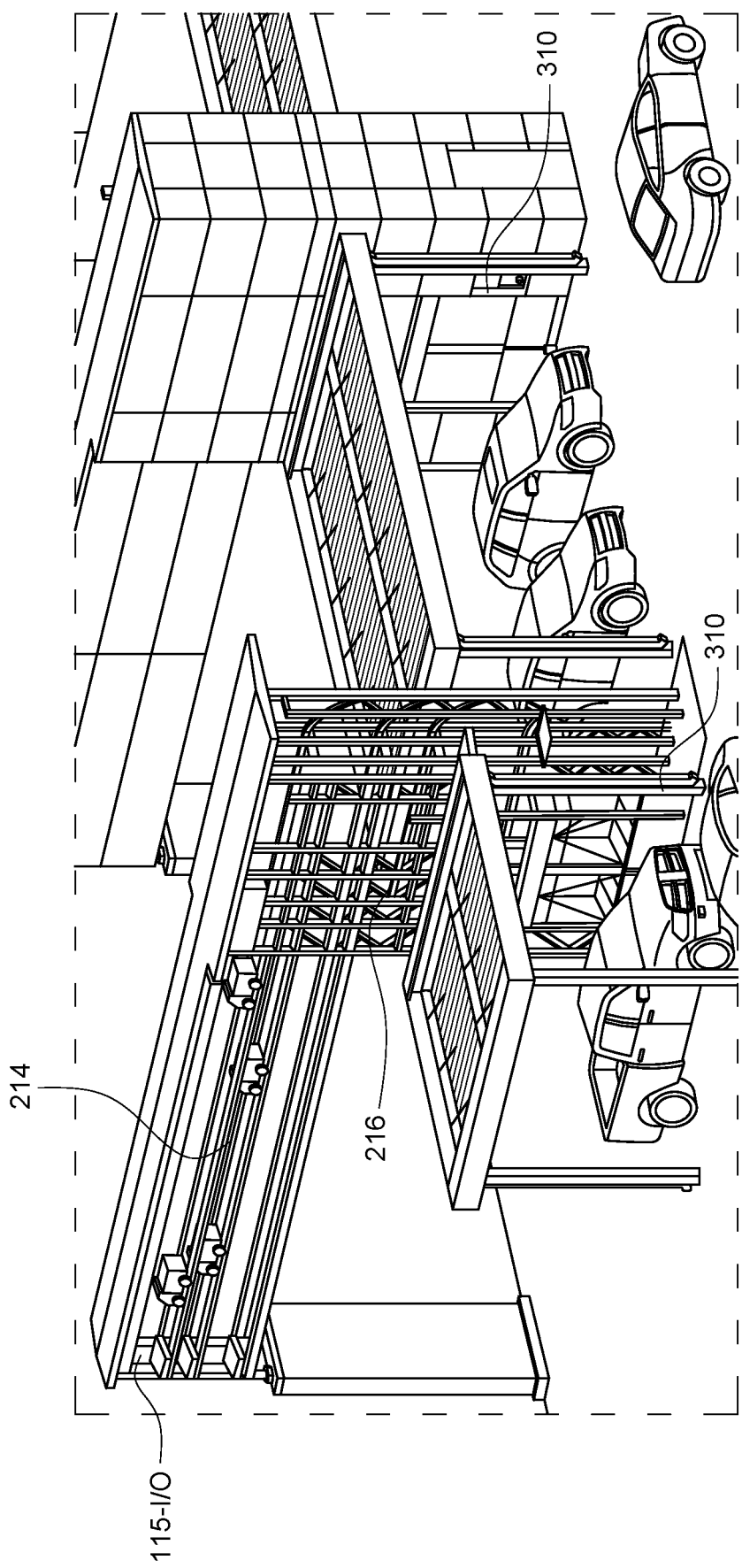

FIGS. 4A and 4B show the horizontal transit rails 214 connecting the turning decks 115 to the vertical towers 216. However, in further embodiments, the horizontal transit rails 214 may be omitted as seen in FIG. 1C, and the turning deck I/O 115-I/O connected directly to one or more vertical towers or the dispense portal directly with or without one or more towers. Such embodiments may be used to deliver mobile robots directly from the storage structure 102 to a dispense port 310 located within the facility, or outside facility such as to a drive-up location as shown in FIGS. 4A and 4B. In alternate aspects, the dispense portal 310 may be a rack based dispense portal or docking station where order totes are dispensed to removeable racks, the racks configured for transport by truck or otherwise as disclosed in U.S. Patent Publication No. 2022-0219904 published Jul. 14, 2022 and entitled "TRANSPORT RACK AND TRANSPORT RACK DOCKING INTERFACE" incorporated by reference herein in its entirety.

As shown in FIG. 1, the system 100 may include decks 112 added onto the storage structure 102 at either end. However, it is a feature of the turning decks 115 of the present technology that they may be assembled, or integrated, into the storage structure 102, at one or several points along the length of storage structure 102. The turning decks in a vertical segment may be a modular unit that may be easily inserted between two adjacent segments of the storage structure 102. The vertical spacing between turning decks 115 in a vertical segment are configured to match the vertical spacing between levels in the storage structure 102 so that a vertical segment may be easily inserted and affixed between the adjacent segments of the storage structure and then be operable as described above.

In summary, the present technology relates to an automated order fulfillment system, comprising mobile robots configured to transport totes carrying goods, the automated order fulfillment system comprising: a storage structure configured to store the totes, the storage structure comprising an array of storage locations, the array having a first end, a second end and a length between the first and second ends; and one or more turning decks integrated into the storage structure, between the first and second ends of the array, allowing the mobile robots to change direction while in the storage structure.

In a further example, the present technology relates to an automated order fulfillment system, comprising mobile robots configured to transport totes carrying goods, the automated order fulfillment system comprising: a storage structure configured to store the totes, the storage structure comprising first and second opposed sides, and an array of storage locations, the array having a first end, a second end and a length between the first and second ends; and one or more turning decks between first and second portions of the storage structure, and between the first and second ends of the array, the one or more turning decks being configurable to allow the mobile robot to: pass straight between the first and second portions of the storage structure, exit the storage structure through the first side and/or exit the storage structure through the second side.

In another embodiment, the present technology relates to an automated order fulfillment system, comprising mobile robots configured to transport totes carrying goods, the automated order fulfillment system comprising: a storage structure configured to store the totes, the storage structure comprising an array of storage locations, the array having a first end, a second end and a length between the first and second ends; one or more turning decks between the first and second ends of the array, the turning deck configured to allow the mobile robot to pass between portions of the storage structure on either side of the turning deck and/or to exit the storage structure; and an automated dispense portion affixed directly to at least one of the one or more turning decks, the automated dispense portion configured to allow the mobile robot to travel directly between the one or more turning decks and a dispense portal where goods may be removed from a tote of the totes or put into the tote.

In a further example, the present technology relates to a method of operating an automated order fulfillment system, comprising mobile robots configured to transport totes carrying goods and a storage structure configured to store the totes, the storage structure comprising an array of storage locations, the array having a first end, a second end and a length between the first and second ends, the method comprising: acquiring a container stored at a storage location with a mobile robot of the mobile robots; transporting the mobile robot out of the storage structure at a position between the first and second ends of the storage structure using a turning deck at the position; transporting the mobile robot directly from the turning deck to an automated dispense portion connected to the storage structure at the turning deck, the contents of the container being made accessible to a customer or customer proxy at a dispense portal of the automated dispense portion.

The foregoing detailed description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated. It is intended that the scope of the method be defined by the claims appended hereto.

What is claimed is:

1. An automated order fulfillment system, comprising mobile robots configured to transport totes carrying goods, the automated order fulfillment system comprising:
   a storage structure configured to store the totes, the storage structure comprising an array of storage locations, the array having a first end, a second end and a length between the first and second ends; and
   one or more turning decks integrated into the storage structure, between the first and second ends of the array, allowing the mobile robots to change direction while in the storage structure;
   wherein a turning deck of the one or more turning decks directly connects to an automated dispense portion configured to deliver goods to and from a dispense portal so that an output of the turning deck interfaces with and feeds the automated dispense portion.

2. The automated order fulfillment system of claim 1, wherein a turning deck of the one or more turning decks comprises a turning deck input/output allowing mobile robots to exit or enter the storage structure.

3. The automated order fulfillment system of claim 1, wherein the array of storage locations comprises a first array of storage locations, the storage structure further comprising a second array of storage locations adjacent the first array of storage locations, and an aisle defined between the first and second arrays, the one or more turning decks configured to allow the mobile robots to pass between the aisle on either side of the one or more turning decks.

4. The automated order fulfillment system of claim 1, wherein a turning deck of the one or more turning decks is of a modular construction configured to be inserted between the first and second ends of the storage structure.

5. The automated order fulfillment system of claim 4, wherein the turning deck of modular construction has as many vertical levels as the storage structure.

6. The automated order fulfillment system of claim 4, wherein the turning deck of modular construction comprises vertical levels configured with a same vertical spacing as levels of the storage structure.

7. The automated order fulfillment system of claim 1, wherein a turning deck of the one or more turning decks comprises passive bumpers allowing the mobile robot traveling along the length of the storage structure to pass through the turning deck, exit the storage structure on a first side of the storage structure and exit the storage structure on a second side of the storage structure opposed to the first side.

8. The automated order fulfillment system of claim 1, wherein a turning deck of the one or more turning decks comprises directed bumpers allowing the mobile robot traveling along the length of the storage structure to do one of: pass through the turning deck, exit the storage structure on a first side of the storage structure and exit the storage structure on a second side of the storage structure opposed to the first side.

9. An automated order fulfillment system, comprising mobile robots configured to transport totes carrying goods, the automated order fulfillment system comprising:
   a storage structure configured to store the totes, the storage structure comprising first and second opposed sides, and an array of storage locations, the array having a first end, a second end and a length between the first and second ends; and
   one or more turning decks between first and second portions of the storage structure, and between the first and second ends of the array, the one or more turning decks being configurable to allow the mobile robot to: pass straight between the first and second portions of the storage structure, exit the storage structure through the first side, and/or exit the storage structure through the second side;
   wherein the one or more turning decks has an input/output mechanism so that entry/exit of the mobile robot to/from each of the one or more turning deck is via the input/output mechanism of the turning deck.

10. The automated order fulfillment system of claim 9, wherein the input/output mechanism comprises a bumper system having bumpers on either side of the turning deck.

11. The automated order fulfillment system of claim 10, wherein the bumpers are passive, allowing the mobile robot to pass straight between the first and second portions of the storage structure, exit the storage structure through the first side and exit the storage structure through the second side.

12. The automated order fulfillment system of claim 10, wherein the bumpers are configured to position the mobile robot on the centerline of the turning deck input/output.

13. The automated order fulfillment system of claim 10, wherein the storage structure comprises a first set of storage locations separated by a first aisle and a second set of storage structure separated by a second aisle, and wherein the one or more turning decks comprise two contiguous turning decks, one in the first aisle and one in the second aisle, the two contiguous turning decks allowing mobile robots to pass freely between the first and second sets of storage locations between the first and second ends of the storage structure.

14. An automated order fulfillment system, comprising mobile robots configured to transport totes carrying goods, the automated order fulfillment system comprising:
- a storage structure configured to store the totes, the storage structure comprising an array of storage locations, the array having a first end, a second end and a length between the first and second ends;
- one or more turning decks between the first and second ends of the array, the turning deck configured to allow the mobile robot to pass between portions of the storage structure on either side of the turning deck and/or to exit the storage structure; and
- an automated dispense portion affixed directly to at least one of the one or more turning decks, the automated dispense portion configured to allow the mobile robot to travel directly between the one or more turning decks and a dispense portal of the automated dispense portion where goods may be removed from a tote of the totes or put into the tote so that the goods are respectively removed from the automated order fulfillment system or introduced to the automated order fulfillment system by a customer or customer proxy at the dispense portal.

15. The automated order fulfillment system of claim 14, wherein the automated dispense portion comprises mobile robot transit rails for horizontal transport of mobile robots to or from the one or more turning decks.

16. The automated order fulfillment system of claim 14, wherein the automated dispense portion comprises one or more vertical towers for vertical transport of mobile robots to or from the dispense portal.

17. A method of operating an automated order fulfillment system, comprising mobile robots configured to transport totes carrying goods and a storage structure configured to store the totes, the storage structure comprising an array of storage locations, the array having a first end, a second end and a length between the first and second ends, the method comprising:
- acquiring a container stored at a storage location with a mobile robot of the mobile robots;
- transporting the mobile robot out of the storage structure at a position between the first and second ends of the storage structure using a turning deck at the position;
- transporting the mobile robot directly from the turning deck to an automated dispense portion connected to the storage structure at the turning deck, the contents of the container being made accessible to a customer or customer proxy at a dispense portal of the automated dispense portion for removal from the automated order fulfillment system.

18. The method of claim 17, further comprising the steps of:
- accepting goods into a container positioned at the dispense portal from a customer or customer proxy;
- transporting the container into which goods were accepted directly from the automated dispense portion into the storage structure through the turning deck by a mobile robot;
- transporting the container into which goods were accepted from the turning deck to a storage location of the storage structure by the mobile robot; and
- transferring the container into which goods were accepted into the storage location.

19. The method of claim 18, wherein said step of transporting the container into which goods were accepted from the turning deck to a storage location of the storage structure by the mobile robot comprises the step of the mobile robot moving between adjacent aisles of the storage structure, between the first and second ends of the storage structure, via a second turning deck connecting the first and second aisles.

* * * * *